US010613873B2

(12) United States Patent
Yang et al.

(10) Patent No.: US 10,613,873 B2
(45) Date of Patent: *Apr. 7, 2020

(54) BOOT SYSTEM AND BOOT METHOD FOR INTELLIGENT ROBOT

(71) Applicant: AROBOT INNOVATION CO., LTD., New Taipei (TW)

(72) Inventors: Shih-Ming Yang, Hsinchu County (TW); Po-Chun Yen, Taipei (TW); Shing Lee, Hsinchu (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 180 days.

This patent is subject to a terminal disclaimer.

(21) Appl. No.: 15/896,135

(22) Filed: Feb. 14, 2018

(65) Prior Publication Data
US 2019/0129725 A1   May 2, 2019

(30) Foreign Application Priority Data

Oct. 26, 2017 (TW) .............................. 106136881 A

(51) Int. Cl.
*G06F 9/00* (2006.01)
*G06F 15/177* (2006.01)
(Continued)

(52) U.S. Cl.
CPC .............. *G06F 9/4416* (2013.01); *G06F 1/24* (2013.01); *G06F 9/4401* (2013.01); *G06F 21/31* (2013.01);
(Continued)

(58) Field of Classification Search
CPC ..................................................... G06F 9/4416
See application file for complete search history.

(56) References Cited

U.S. PATENT DOCUMENTS

| 8,918,213 B2 * | 12/2014 | Rosenstein | ............. | B25J 5/007 |
| | | | | 700/258 |
| 2007/0203685 A1 * | 8/2007 | Takano | ................... | H04L 67/12 |
| | | | | 703/23 |

(Continued)

FOREIGN PATENT DOCUMENTS

| CN | 105979514 A | * | 9/2016 | ............... G06K 7/14 |
| CN | 105979514 A | | 9/2016 | |

(Continued)

*Primary Examiner* — Mohammed H Rehman
(74) *Attorney, Agent, or Firm* — Li & Cai Intellectual Property (USA) Office

(57) ABSTRACT

Disclosed is a boot system and boot method for an intelligent robot. The boot system includes the intelligent robot and a mobile device. The intelligent robot includes an activating module, a wireless communication module and an image capturing device. The central processing unit is electrically connected to the activating module, the wireless communication module and the image capturing module. The mobile device includes an input interface, a first memory and a display. The input interface includes a username frame and a password frame. The username frame is configured to receive a username. The password frame is configured to receive a password. When the username and the password received by the input interface is compliant with the username and the password of the mobile device, the display indicates a verification code. The verification code includes a login username and a login password for establishing wireless network communication.

9 Claims, 3 Drawing Sheets

(51) Int. Cl.
  *G06F 9/4401* (2018.01)
  *H04W 12/06* (2009.01)
  *G06F 21/50* (2013.01)
  *H04L 29/06* (2006.01)
  *G06F 21/31* (2013.01)
  *G06F 21/35* (2013.01)
  *G06F 1/24* (2006.01)

(52) U.S. Cl.
  CPC .............. *G06F 21/35* (2013.01); *G06F 21/50* (2013.01); *H04L 63/083* (2013.01); *H04W 12/06* (2013.01)

(56) References Cited

U.S. PATENT DOCUMENTS

| | | |
|---|---|---|
| 2014/0121786 A1 | 5/2014 | Chen et al. |
| 2016/0134686 A1 | 5/2016 | Youker et al. |
| 2018/0036879 A1* | 2/2018 | Buibas .................. B25J 19/021 |
| 2019/0223093 A1* | 7/2019 | Watfa .................... H04W 36/06 |
| 2019/0238811 A1* | 8/2019 | Xiu ....................... G06T 3/0087 |

FOREIGN PATENT DOCUMENTS

| | | | | |
|---|---|---|---|---|
| CN | 107241247 A | | 10/2017 | |
| TW | M483510 U | * | 8/2014 | ............. G08B 21/00 |
| TW | M483510 U | | 8/2014 | |
| TW | 201501759 A | | 1/2015 | |

\* cited by examiner

BOOT SYSTEM AND BOOT METHOD FOR INTELLIGENT ROBOT

BACKGROUND OF THE INVENTION

1. Field of the Invention

The instant disclosure relates to a boot system, and in particular, to a boot system and boot method for an intelligent robot.

2. Description of Related Art

With the development of technology, robots have replaced the need for manual labor in work requiring hard labor, for example, using mechanical arms for heavy lifting or complicated processes. In recent years, domestic robots have been widely accepted by people, and may be used for house cleaning and human-robot interaction. However, the boot process of robots generally involves complex procedures, which causes inconveniences in use.

SUMMARY OF THE INVENTION

The instant disclosure provides a boot system for an intelligent robot. The boot system includes the intelligent robot and a mobile device. The intelligent robot includes an activating module, a central processing unit, a wireless communication module and an image capturing device. The central processing unit is electrically connected to the activating module, the wireless communication module and the image capturing device. The activating module is configured to receive an activating signal. The central processing unit is configured to process images. The wireless communication module is configured to connect to a wireless network. The image capturing device is configured to capture an image. The mobile device includes an input interface, a first memory and a display. The input interface includes a username frame and a password frame. The username frame is configured to receive a username. The password frame is configured to receive a password. The first memory stores a plurality of the usernames and the passwords. When the username and the password received by the input interface is compliant with one of the usernames and passwords stored by the first memory, the display indicates a verification code. The verification includes a login username and a login password for connecting to the wireless network. The wireless communication module connects to the wireless network by the login username and the login password after the image capturing device captures the verification code from the mobile device.

The instant disclosure further provides a boot method for an intelligent robot. The intelligent robot connects to a mobile device. The intelligent robot includes an activating module, a central processing unit, a wireless communication module and an image capturing device. The central processing unit is electrically connected to the activating module, the wireless communication module and the image capturing device. The mobile device includes an input interface, a first memory and a display. The first memory stores a plurality of usernames and passwords. The input interface includes a username frame and a password frame. The boot method includes: receiving an activating signal from the activating module; determining whether the intelligent robot is connected to a wireless network by the wireless communication module; capturing an image by the image capturing device; receiving a username by the username frame; and receiving a password by the password frame. When the username and the password received by the input interface is compliant with one of the usernames and passwords stored by the first memory, the display indicates a verification code, the verification includes a login username and a login password for connecting to the wireless network. The wireless communication module connects to the wireless network by the login username and the login password after the image capturing device captures the verification code from the mobile device.

The instant disclosure further provides an intelligent robot. The intelligent robot includes a central processing unit, an activating module and an image capturing module. The central processing unit is configured to process images. The activating module is electrically connected to the central processing unit for receiving an activating signal. The wireless communication module is electrically connected to the central processing unit for connecting to a wireless network. The image capturing module is electrically connected to the central processing unit. When the activating module is enabled, the central processing unit determines whether the wireless communication module can establish a wireless network communication with the wireless network, if not, the image capturing device is activated to capture an image, and the central processing unit receives a login username and a login password from the image to establish the wireless network communication therewith.

For further understanding of the instant disclosure, reference is made to the following detailed description illustrating the embodiments of the instant disclosure. The description is only for illustrating the instant disclosure, and should not be construed as limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
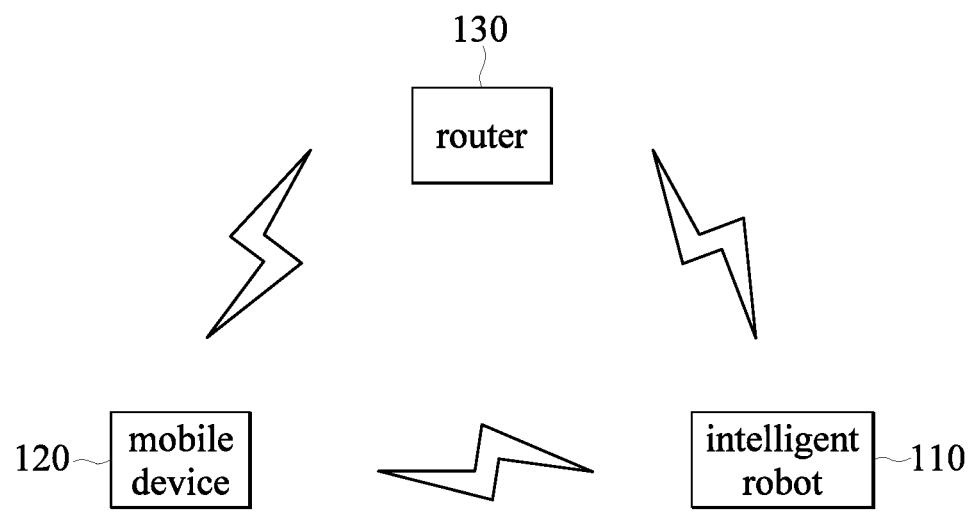
FIG. 1 shows a block diagram of a boot system for an intelligent robot of one embodiment of the instant disclosure.

Reference is made to FIG. 1. FIG. 1 shows a block diagram of a boot system for an intelligent robot of one embodiment of the instant disclosure. The boot system 100 includes an intelligent robot 110, a mobile device 120 and a router 130. A user may input a username and password corresponding to the intelligent robot 110 by the input interface of the mobile device 120. More specifically, there may be two, three or five domestic intelligent robots, and any one of these intelligent robots includes a specific username and password for connecting to the mobile device 120, but the number of the intelligent robot 110 is not limited in the present disclosure. In addition, when the user inputs the username and password through the input interface, the mobile device 120 displays a Quick Response Code (QR code). The intelligent robot 110 captures the QR code for connecting to the router 130. The intelligent robot 110 generates a specific light or sound after connecting to the router 130 for informing the user of a successful connection. Conversely, the intelligent robot 110 generates another specific light or sound when the intelligent robot cannot be connected to the router 130 for informing the user of a failed connection, and initializes the intelligent robot 110 for reconnecting to the mobile device 120

Figure 2:
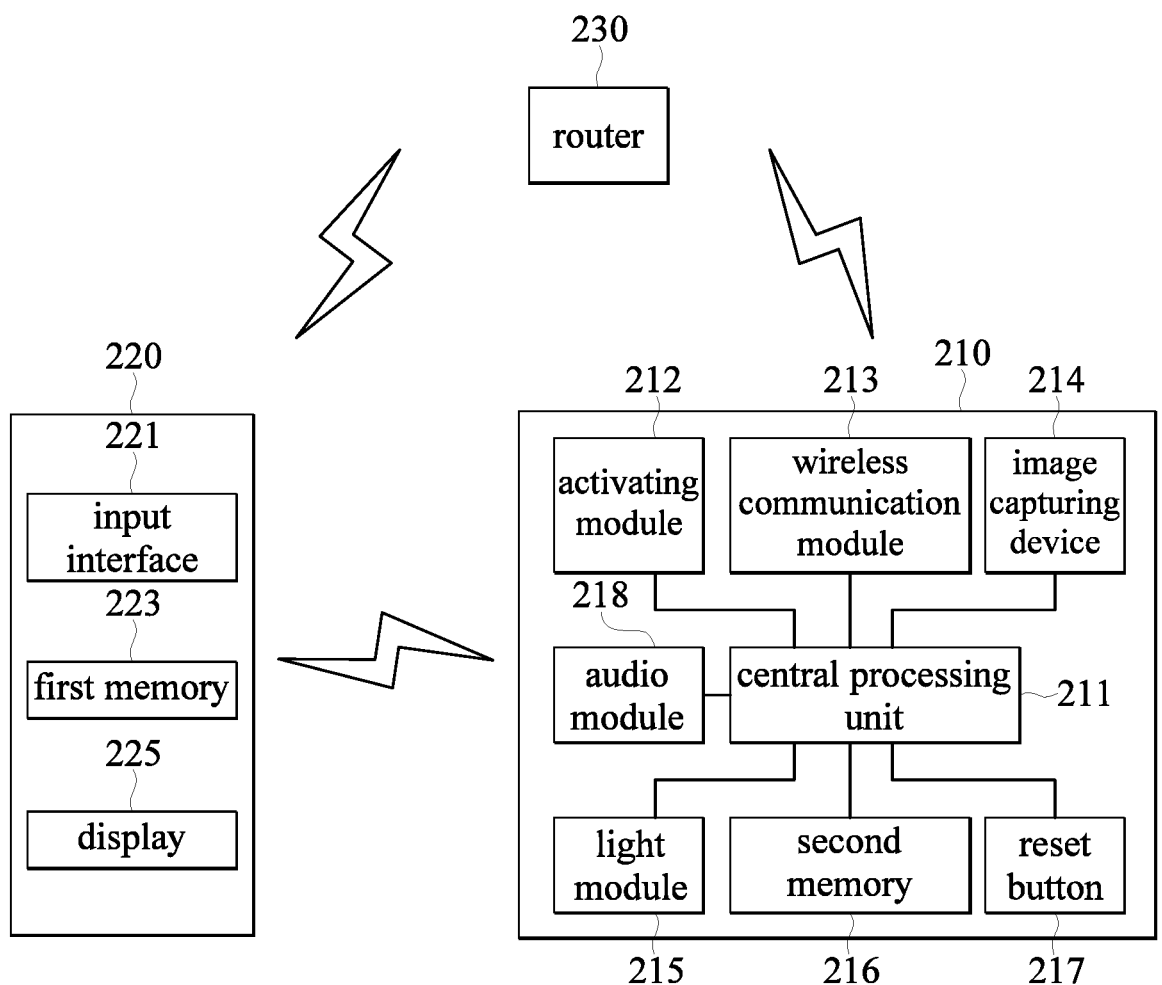
FIG. 2 shows a block diagram of the boot system for an intelligent robot of another embodiment of the instant disclosure.

Reference is made to FIG. 2. FIG. 2 shows a block diagram of a boot system for an intelligent robot of another embodiment of the instant disclosure. The boot system 200 includes an intelligent robot 210, a mobile device 220 and a router 230.

The intelligent robot 210 includes a central processing unit 211, an activating module 212, a wireless communication module 213, an image capturing device 214, a light module 215, a second memory 216, a reset button 217 and an audio module 218. The central processing unit 211 is electrically connected to the activating module 212, the wireless communication module 213 and the image capturing device 214. The activating module 212 is configured to receive an activating signal, and may be, for example, a button or a knob. When the user presses the button or the knob, a battery (not shown) of the intelligent robot 210 provides electric energy to other electronic components thereof. The central processing unit is configured to process images and determines whether the image includes a barcode or a QR code. The wireless communication module 213 may receive or transmit a wireless signal by the wireless network. The image capturing device 214 is configured to capture the image and includes a camera lens. The camera lens opens automatically when the intelligent robot 210 is powered on. In addition, the intelligent robot 210 may include a sensor (not shown) configured to detect an object. For example, the mobile device 220 may automatically open the camera lens when a distance between a human and the intelligent robot 210 is less than two meters for capturing the image of the human and distinguishing gender, age, and so forth.

The mobile device 220 includes an input interface 221, a first memory 223 and display 225. The input interface 221 includes a username frame and a password frame. The username frame is configured to receive a username (e.g., 001 or 123). The password frame is configured to receive a password (e.g., abc or def). The first memory 223 stores a plurality of usernames and passwords. When the username and password received by the input interface 221 is compliant with the username and password stored by the first memory 223 of the mobile device 220, the display 225 indicates a verification code. The verification code includes a login username and a login password for connecting to the wireless network. For example, when a user inputs the username (e.g., 001) and the password (e.g., abc), the display 225 of the mobile device 220 indicates a first verification code for connecting a first intelligent robot to the router 230. For example, when the user inputs the username (e.g., 123) and the password (e.g., def), the display 225 of the mobile device 220 displays a second verification code for connecting a second intelligent robot to the router 230. When the central processing unit 211 determines that the verification code is compliant with a predetermined verification code by the image capturing device 214, the intelligent robot 210 receives a plurality of designated commands for respectively generating a designated behavior according to each of the plurality of designated commands. For example, the user may control the direction and speed of the intelligent robot 210 by the mobile device 220, the user may control the intelligent robot 210 to broadcast news and weather forecasts by the mobile device 210, or the user may control the intelligent robot 210 to clean the floor by the mobile device 210.

The light module 215 is electrically connected to the central processing unit 211. When the central processing unit 211 determines that the verification code is compliant with the predetermined verification code by the image capturing device 214, the light module 215 emits a first light, which may be, for example, a green light. When the central processing unit 211 determines that the verification code is not compliant with the predetermined verification code by the image capturing device 214, the light module 215 emits a second light, which may be, for example, a red light. The verification code is a barcode or a QR code.

When the wireless communication module 213 determines that the intelligent robot 210 is connected to the wireless network, the intelligent robot 210 connects to the router 230 for receiving and transmitting a designated command, the intelligent robot 210 generates a designated behavior according to the designated command. When the central processing unit 211 determines that the intelligent robot 219 cannot be connected to the wireless network by the wireless communication module 213, the central processing unit 211 activates the camera lens of the image capturing device 214 for capturing the barcode or the QR code. When the central processing unit 211 determines that the QR code is compliant with the predetermined verification code by image processing, the intelligent robot 210 automatically connects to the router 230 by the wireless communication module 213.

The second memory 216 is electrically connected to the central processing unit 211. The second memory 216 stores a plurality of usernames and passwords of the intelligent robot 210. When the username and password of the mobile device 220 is compliant with one the usernames and passwords of the intelligent robot 210, and the verification code is compliant with the predetermined verification code, a first sound is output through the audio module 218 of the intelligent robot 210, which may be, for example, a long sound lasting for five-seconds. When the username and password of the mobile device 220 is not compliant with one the usernames and passwords of the intelligent robot 210, and the verification code is not compliant with the predetermined verification code, a second sound is output through the audio module 218 of the intelligent robot 210, which may be, for example, a short sound lasting for only three-seconds.

The reset button 217 is electrically connected to the central processing unit 211. When the intelligent robot 210 cannot be connected to the router 230, the intelligent robot 210 generates a reset signal, for example, the reset signal may emit a flashing orange light for reminding the user to press the reset button 217. When the user presses the reset button 217, the reset button 217 receives an initialization signal for initializing the intelligent robot 210. The wireless communication module 213 determines whether the intelligent robot can be connected to the wireless network.

In one embodiment, when the activating module 212 is enabled, the central processing unit 211 determines whether the wireless communication module 213 can establish a wireless network communication with the wireless network, if not, the image capturing device 214 is activated to capture an image, and the central processing unit 211 receives a login username and a login password from the image to establish the wireless network communication therewith. The display of the mobile device 220 displays the image (e.g., the QR code) including the login username and the login password for entering the wireless network.

Figure 3:
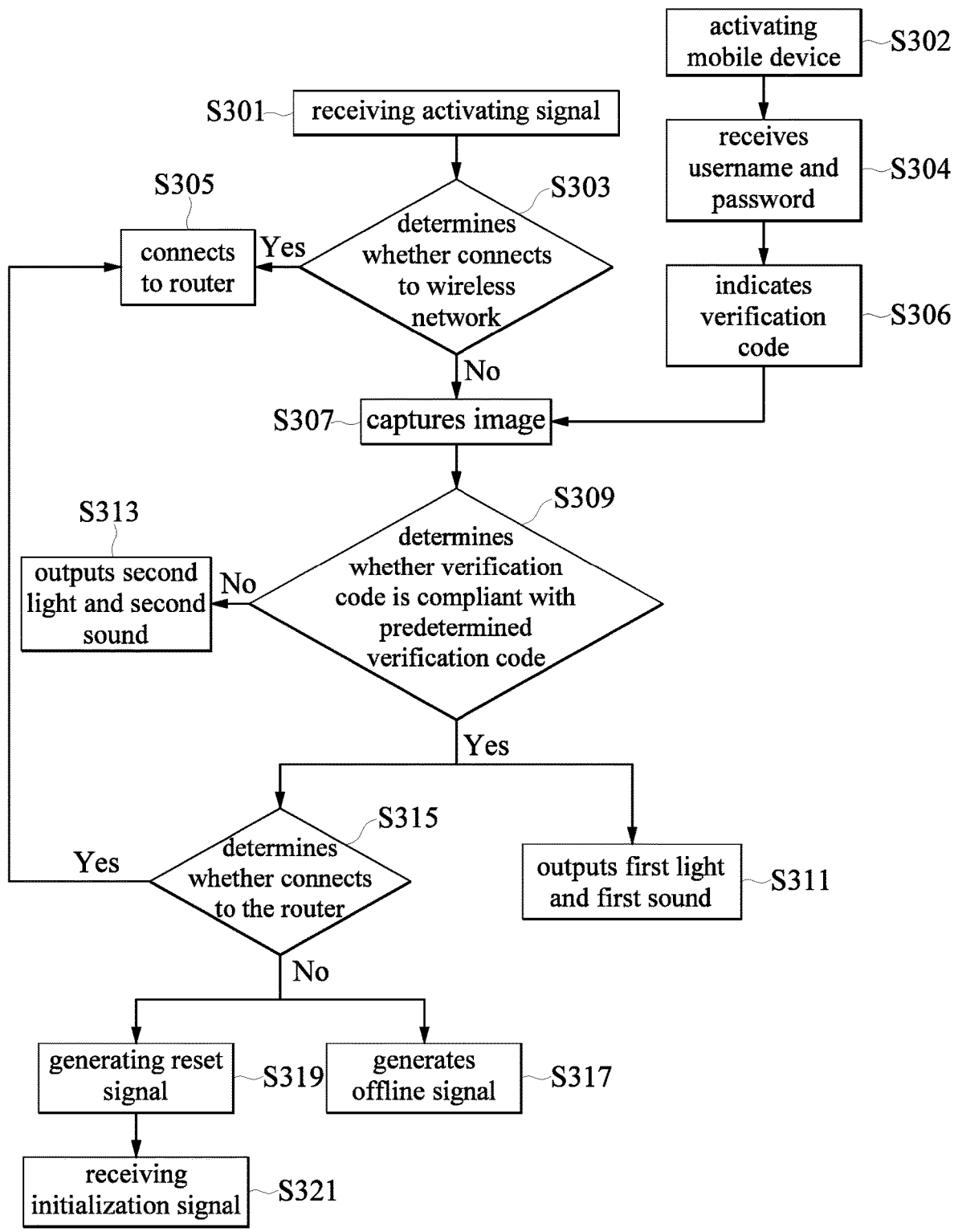
FIG. 3 shows a flow chart of a boot method for an intelligent robot of one embodiment of the instant disclosure.

In conjunction with FIG. 2, FIG. 3 shows a flow chart of a boot method for an intelligent robot of one embodiment of the instant disclosure. The boot method of the intelligent robot 210 is configured to connect to a mobile device 220. The intelligent robot 210 includes an activating module 212, a central processing unit 211, a wireless communication module 213 and an image capturing device 214. The central processing unit 211 is electrically connected to the activating module 212, the wireless communication 213 and the image capturing device 214. The mobile device 220 includes an input interface 221, a first memory 223 and a display 225. The first memory 223 stores a plurality of usernames and passwords. The input interface 221 includes a username frame and a password frame.

In Step S301 of the boot method, an activating signal is received by the activating module 212. In Step S303, the wireless communication module 213 determines whether the intelligent robot 210 can be connected to the wireless network. If yes, the method proceeds to Step S305; if not, the method proceeds to Step S307. In Step S305, the wireless communication module 213 connects to a router 230. In Step S307, the central processing unit 211 activates the camera lens of the image capturing device 214, the image capturing device 214 captures an image of the display 225 of the mobile device 220. In Step S302, the mobile device 220 is activated. In Step S304, the username frame receives a username, and the password frame receives a password. In Step S306, when the username and password received by the input interface 221 is compliant with the username and password stored by the first memory 223 of the mobile device 220, the display 225 indicates a verification code. The image capturing device 214 is configured to capture the verification code of the display 225.

In Step S309, the central processing unit 211 determines whether the verification code is compliant with a predetermined verification code. If yes, the method proceeds to Step S311 and S315; if not, the method proceeds to Step S313. When the central processing unit 211 determines that the verification code is compliant with the predetermined verification code by the image capturing device 214, the intelligent robot 210 receives a plurality of designated commands. The intelligent robot 210 respectively generates a designated behavior according to each of the designated commands. In Step S311, the light module 215 emits a first light, and the audio module 218 outputs a first sound. In Step S313, the light module 215 emits a second light, and the audio module 218 outputs a second sound.

In Step S315, the wireless communication module 213 determines whether the intelligent robot 210 can be connected to the router 230. If yes, the method proceeds to Step S305; if not, the method proceeds to Step S317 and Step S319. In Step S317, the intelligent robot 210 generates an offline signal, for example, the offline signal may emit a flashing red light through the light module 215. In Step S319, the intelligent robot 210 generates a reset signal, for example, the reset signal may output an alternating long-short sound through the audio module 218. In Step S321, the reset button 217 receives an initialization signal for initializing the intelligent robot 210.

To sum up, the instant disclosure provides a boot system and a boot method for an intelligent robot. When the username and password received by an input interface is compliant with the username and password stored by a mobile device, the mobile device indicates a verification code. The intelligent robot captures the verification code from the mobile device. A light module and an audio module determine whether the intelligent robot is connected to a router to reduce complex procedures conventionally required for powering on an intelligent robot. In addition, when the intelligent robot cannot be connected to the router, it can attempt to reconnect to the wireless network when a reset button is pressed, which increases the convenience of the boot system provided by the present disclosure.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A boot system for an intelligent robot, the boot system comprising:
an intelligent robot including an activating module, a central processing unit, a wireless communication module and an image capturing device, the central processing unit electrically connected to the activating module, the wireless communication module and the image capturing device, the activating module being configured to receive an activating signal, the central processing unit configured to process images, the wireless communication configured to connect to a wireless network, the image capturing device configured to capture an image;
a mobile device including an input interface, a first memory and a display, the input interface having a username frame and a password frame, the username frame configured to receive a username corresponding to the intelligent robot, the password frame configured to receive a password corresponding to the intelligent robot, and the first memory storing a plurality of usernames and passwords, wherein when the username and the password corresponding to the intelligent robot received by the input interface of the mobile device is compliant with one of the usernames and passwords stored by the first memory, the display of the mobile device indicates a verification code, and the verification code including a login username and a login password for connecting the intelligent robot to the wireless network;
wherein the wireless communication module of the intelligent robot connects to the wireless network by the login username and the login password after the image of the intelligent robot capturing device captures the verification code from the mobile device.

2. The boot system according to claim 1, wherein the intelligent robot further includes a light module electrically connected to the central processing unit, when the central processing unit determines the verification code is compliant with a predetermined verification code by the image capturing device, the intelligent robot emits a first light through the light module, when the central processing unit determines that the verification code is not compliant with the predetermined verification code by the image capturing device, the intelligent robot outputs a second light through the light module, and the verification code is quick response code.

3. The boot system according to claim 1, wherein when the wireless communication module determines that the intelligent robot is connected to the wireless network, the intelligent robot connects to a router, when central processing unit determines that the wireless communication module cannot be connected to the wireless network, the central processing unit activates a camera lens of the image capturing device, wherein when the central processing unit determines the verification code is compliant with a predetermined verification code by the image capturing device, the intelligent robot receives a plurality of designated commands from the mobile device and respectively generates an designated behavior according to each of the plurality of designated commands.

4. The boot system according to claim 1, wherein the intelligent robot includes a reset button electrically connected to the central processing unit, and when the intelligent robot disconnects from a router, the intelligent robot generates a reset signal, the reset button being configured to receive an initialization signal for initializing the intelligent robot.

5. A boot method for an intelligent robot, the intelligent robot connecting to a mobile device, the intelligent robot having an activating module, a central processing unit, a wireless communication module and an image capturing device, the central processing unit being electrically connected to the activating module, the wireless communication module and the image capturing device, the mobile device including an input interface, a first memory and a display, the first memory storing a plurality of usernames and passwords, the input interface including a username frame and a password frame, the boot method comprising:
  receiving a username corresponding to the intelligent robot by the username frame of the mobile device;
  receiving a password corresponding to the intelligent robot by the password frame of the mobile device, wherein when the username and the password corresponding to the intelligent robot received by the input interface of the mobile device is compliant with one of the usernames and passwords stored by the first memory, the display of the mobile device indicates a verification code, and the verification code includes a login username and a login password for connecting the intelligent robot to a wireless network; and
  capturing an image by the image capturing device of the intelligent robot, and the image including the verification code;
  wherein the wireless communication module of the intelligent robot connects to the wireless network by the login username and the login password after the image capturing device of the intelligent robot captures the verification code from the mobile device.

6. The boot method according to claim 5, the intelligent robot including a light module electrically connected to the central processing unit, the boot method further comprising:
  wherein when the central processing unit determines that the verification code is compliant with a predetermined verification code by the image capturing device, the intelligent robot emits a first light through the light module, when the central processing unit determines the verification code is not compliant with the predetermined verification code by the image capturing device, the intelligent robot emits a second light through the light module, the verification code is quick response code.

7. The boot method according to claim 5, comprising:
  wherein when the wireless communication module determines the intelligent robot is connected to the wireless network, the intelligent robot connect to a router, when the central processing unit determines the wireless communication module cannot be connected to the wireless network, the central processing unit activates camera lens of the image capturing device, wherein when the central processing unit determines the verification code is compliant with a predetermined verification code by the image capturing device, the intelligent robot receives a plurality of designated commands from the mobile device and respectively generates an designated behavior according to each of the plurality of designated commands.

8. The boot method according to claim 5, the intelligent robot includes a reset button electrically connected to the central processing unit, the boot method further comprising:
  when the intelligent robot disconnects from a router, the intelligent robot generates a reset signal, the reset button being configured to receive a initialization signal for initializing the intelligent robot.

9. An intelligent robot, comprising:
  a central processing unit configured to process images;
  an activating module electrically connected to the central processing unit for receiving an activating signal;
  a wireless communication module electrically connected to the central processing unit for connecting to a wireless network; and
  an image capturing module electrically connected to the central processing unit;
  wherein when the activating module is enabled, the central processing unit determines whether the wireless communication module can establish a wireless network communication with the wireless network, if not, the image capturing device is activated to capture an image, the image includes a verification code, and the verification code is provided by a mobile device;
  wherein when a username and a password corresponding to the intelligent robot received by an input interface of the mobile device is compliant with one of usernames and passwords stored by the mobile device, a display of the mobile device indicates the verification code, the verification code includes a login username and a login password for connecting the intelligent robot to the wireless network, and the wireless communication module of the intelligent robot connects to the wireless network by the login username and the login password after the image capturing device of the intelligent robot captures the verification code from the mobile device.

* * * * *